(12) United States Patent
Cho et al.

(10) Patent No.: US 7,473,493 B2
(45) Date of Patent: Jan. 6, 2009

(54) PROCESS OF PREPARING ACTIVE MATERIAL FOR BATTERY AND ACTIVE MATERIAL FOR BATTERY PREPARED THEREFROM

(75) Inventors: Jae-Phil Cho, Cheonan (KR); Yong-Chul Park, Suwon (KR); Won-Il Jung, Seongnam (KR); Geun-Bae Kim, Suwon (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 898 days.

(21) Appl. No.: 10/408,124

(22) Filed: Apr. 8, 2003

(65) Prior Publication Data

US 2003/0211391 A1  Nov. 13, 2003

(30) Foreign Application Priority Data

May 13, 2002   (KR) ...................... 10-2002-0026199

(51) Int. Cl.
*H01M 6/08* (2006.01)
(52) U.S. Cl. .................. 429/322; 429/321; 429/231.95
(58) Field of Classification Search ................. 429/322, 429/321, 153, 163
See application file for complete search history.

(56) References Cited

U.S. PATENT DOCUMENTS

2003/0082448 A1* 5/2003 Cho et al. ................ 429/218.1

2003/0211235 A1* 11/2003 Suh et al. .................. 427/126.1

FOREIGN PATENT DOCUMENTS

| JP | 08-138670 | 5/1996 |
|---|---|---|
| JP | 2002-231227 | 8/2002 |
| JP | 2003-007299 | 1/2003 |

* cited by examiner

*Primary Examiner*—Patrick Ryan
*Assistant Examiner*—Ben Lewis
(74) *Attorney, Agent, or Firm*—Robert E. Bushnell, Esq.

(57) ABSTRACT

A process for preparing an active material for a battery includes the steps of preparing a coating liquid by adding a compound comprising an element X that is capable of forming a double bond with oxygen, and a compound comprising at least one from the group consisting of an alkali metal, an alkaline earth metal, a group 13 element, a group 14 element, a transition metal, and a rare-earth element, to water, adding a metal source to the coating liquid to surface-treat the metal source material, drying the surface-treated metal source material to prepare an active material precursor; mixing the active material precursor with a lithium source; and heat-treating the resultant mixture to produce an active material with a surface-treatment layer comprising the compound of the formula (1):

$$MXO_k \qquad (1)$$

wherein M is at least one selected from the group consisting of an alkali metal, an alkaline earth metal, a group 13 element, a group 14 element, a transition metal, and a rare-earth element; X is an element that can form a double bond with oxygen; and k is a numerical value in the range of 2 to 4.

16 Claims, 2 Drawing Sheets

PROCESS OF PREPARING ACTIVE MATERIAL FOR BATTERY AND ACTIVE MATERIAL FOR BATTERY PREPARED THEREFROM

CLAIM OF PRIORITY

This application makes reference to, incorporates the same herein, and claims all benefits accruing under 35 U.S.C. §119 from an application for PROCESS OF PREPARING ACTIVE MATERIAL FOR BATTERY AND ACTIVE MATERIAL FOR BATTERY PREPARED THEREFROM earlier filed in the Korean Intellectual Property Office on 13 May 2002 and there duly assigned Serial No. 2002-26199.

BACKGROUND OF THE INVENTION

1. Field of the Invention

The present invention relates to an active material for a battery and a process of preparing an active material for a battery, and more specifically to an active material and a process of preparing an active material for a battery with excellent electrochemical characteristics and thermal stability, and an active material for a battery prepared according to the process.

2. Description of the Related Art

Recently, in relation to trends toward more compact and lighter portable electronic equipment, there has been a growing need to develop a high performance and large capacity battery to be used for electric power for portable electronic equipment. Also, there has been extensive research on batteries with good safety characteristics and low cost.

Generally, batteries are classified into primary batteries that can be used only once, and secondary batteries that are rechargeable. Primary batteries include manganese batteries, alkaline batteries, mercury batteries, silver oxide batteries, and so on, and secondary batteries include lead-acid storage batteries, Ni-MH (nickel metal hydride) batteries, nickel-cadmium batteries, lithium metal batteries, lithium ion batteries, lithium polymer batteries, and lithium-sulfur batteries.

These batteries generate electric power by using materials capable of electrochemical reactions at positive and negative electrodes. Factors that affect battery performance characteristics such as capacity, cycle life, power capability, safety, and reliability, include electrochemical properties and thermal stability of active materials that participate in the electrochemical reactions at the positive and negative electrodes. Therefore, research to improve the electrochemical properties and thermal stability of the active materials at the positive and negative electrodes continues.

Among the active materials currently being used for negative electrodes of batteries, lithium metal provides both high capacity because it has a high electric capacity per unit mass, and high voltage due to a relatively high electronegativity. However, since it is difficult to assure the safety of a battery using lithium metal, other materials that can reversibly deintercalate and intercalate lithium ions are being used extensively for the active material of the negative electrodes in lithium secondary batteries.

Lithium secondary batteries use materials that reversibly intercalate or deintercalate lithium ions during charge and discharge reactions for both positive and negative active materials, and they contain organic electrolyte or polymer electrolyte between the positive electrode and the negative electrode. These batteries generate electric energy from changes of chemical potential during the intercalation/deintercalation of lithium ions at the positive and negative electrodes.

Lithium metal compounds of a complex formula are used as the positive active material of a lithium secondary battery. Typical examples include $LiCoO_2$, $LiMn_2O_4$, $LiNiO_2$, $LiNi_{1-x}Co_xO_2$ ($0<x<1$), $LiMnO_2$, and a mixture of these compounds. Manganese-based positive active materials such as $LiMn_2O_4$ or $LiMnO_2$ are the easiest to synthesize, they are less costly than the other materials, and they are environmentally friendly. However, these manganese-based materials have relatively low capacity. $LiCoO_2$ has good electric conductivity, high battery voltage, and excellent electrode characteristics. This compound is presently the most popular material for positive electrodes of commercially available Li-ion batteries. However, it is relatively expensive and has low stability during charge-discharge at a high rate. $LiNiO_2$ is currently the least costly of the positive active materials mentioned above, and it has a high discharge capacity, but it is difficult to synthesize and it is the least stable among the above compounds.

The above active materials are lithiated intercalation compounds in which stability and capacity of active material is determined by the nature of intercalation/deintercalation reactions of lithium ions. As the charging potential increases, the amount of Li deintercalation increases, thus increasing the electrode capacity, but thermal stability of the electrode decreases steeply due to its structural instability. When the interior temperature of the battery increases in the fully charged state, the bonding energy between the metal ions and the oxygen of the active material decreases, releasing oxygen when a temperature above a threshold value is reached. For example, $LiCoO_2$ active material in a charged state has the formula $Li_{1-x}CoO_2$, where $0<x<1$. Because the active material having the above structural formula is unstable, especially when $x>0.5$, if the interior temperature of the battery increases beyond the threshold value, oxygen gas ($O_2$) is released. Since the reaction of this oxygen with organic electrolyte in the battery is highly exothermic, a thermal runaway situation may be created, and this may cause an explosion in the battery. Therefore, it is desirable to control the threshold temperature and the amount of exothermic heat evolved from the reaction in order to improve the safety of the battery.

One way of controlling the threshold temperature and the amount of exothermic heat is to control the surface area of the active material through particle size control, which is usually achieved by pulverizing and sieving the active material. The smaller the particle size, i.e., the larger the total surface area, the better the battery performance, in particular the power capability, i.e., capacity values and discharge voltages at low temperatures and at high rates. However, battery safety, cycle life, and self-discharge become worse as the particle size decreases. Because of these conflicting factors, there is a practical limitation in controlling the threshold temperature and heat evolution rate through particle size alone.

In order to improve stability of active material itself during charge-discharge, it has been suggested to dope other elements into the Ni-based or Co-based lithium oxide. For example, U.S. Pat. No. 5,292,601 discloses $Li_xMO_2$ (where M is at least one element selected from Co, Ni, and Mn; and x is 0.5 to 1) as an improved material over $LiCoO_2$.

Another attempt to improve stability includes modifying the surface of the active material. Japanese Patent Laid-Open No. Hei 9-55210 discloses that a lithium nickel-based oxide is coated with an alkoxide of Co, Al, and Mn, and is heat-treated to prepare a positive active material. Japanese Patent Laid-Open No. Hei 11-16566 discloses a lithium-based oxide coated with a metal and/or an oxide thereof. The metal includes Ti, Sn, Bi, Cu, Si, Ga, W, Zr, B, or Mo. Japanese Patent Laid-Open No. Hei 11-185758 discloses coating a surface of lithium manganese oxide with a metal oxide by using a co-precipitation process and heat-treating the same to prepare a positive active material.

However, the above methods did not solve the fundamental problems associated with the safety of the battery. The threshold temperature wherein the active material prepared according to the above methods begins to react with an electrolyte, that is, the decomposition temperature, at which oxygen bound to metal of the active material begins to be released (exothermic starting temperature, Ts) does not shift sufficiently to a higher temperature, and the amount of released oxygen (the value related to the exothermic heat) does not decrease sufficiently by the methods described above.

The structural stability of positive active material having the composition of $Li_{1-x}MO_2$ (M is Ni or Co) during charging is strongly influenced by the value of x. That is, when $0<x<0.5$, cyclic stability is steadily and stably maintained, but when x is greater than or equal to 0.5, phase transition occurs from a hexagonal phase to a monoclinic phase. This phase transition causes an anisotropic volume change, which induces development of micro-cracks in the positive active material. These micro-cracks damage the structure of the active material, and thus the battery capacity decreases dramatically and the cycle life is reduced. Therefore, when anisotropic volume change is minimized, the capacity and the cycle life of the battery are improved.

In order to increase structural stability of positive active material, U.S. Pat. No. 5,705,291 disclosed a method in which a composition comprising borate, aluminate, silicate, or mixtures thereof was coated onto the surface of lithiated intercalation compound, but it still has a problem with structural stability.

In the above description, positive active materials of lithium secondary batteries and related examples of developments were explained. Recently, in relation to the tendency to develop portable electronic equipment that is more compact and lightweight, other types of batteries have the same demands for an active material that guarantees battery performance, safety, and reliability. Research and development is therefore being accelerated on electrochemical properties and thermal stability of positive active materials to ensure improved performance, safety, and reliability of batteries.

SUMMARY OF THE INVENTION

It is therefore an object of the present invention to provide a process of preparing an active material for a battery with good electrochemical characteristics, such as capacity, cycle life, and good thermal stability.

It is another object to provide a method of preparing an active material with good manufacturing productivity and an economical preparation process.

It is also an object of the present invention to provide an active material for a battery with good electrochemical characteristics, such as capacity, cycle life, and good thermal stability.

It is further an object to provide an active material with good manufacturing productivity and an economical preparation process.

In order to achieve the above and other objectives, the present invention provides a process for preparing an active material for a battery comprising the steps of: a) preparing a coating liquid by adding a first compound comprising an element X that is capable of forming a double bond with oxygen, and a second compound comprising an element M which is at least one selected from the group consisting of an alkali metal, an alkaline earth metal, a group 13 element, a group 14 element, a transition metal, and a rare-earth element, to water; b) adding a metal source to the coating liquid to surface-treat the metal source material; c) drying the surface-treated metal source material to prepare an active material precursor; d) mixing the active material precursor and lithium source; and e) heat-treating the resultant mixture to produce the active material.

The active material has a surface-treatment layer comprising the compound of the formula (1):

$$MXO_k \qquad (1)$$

wherein k is a numerical value in the range of 2 to 4.

The present invention provides an active material precursor having a metal source with a surface-treatment layer comprising the compound of the formula (1).

The present invention provides also an active material with a surface-treatment layer comprising the compound of the formula (1).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
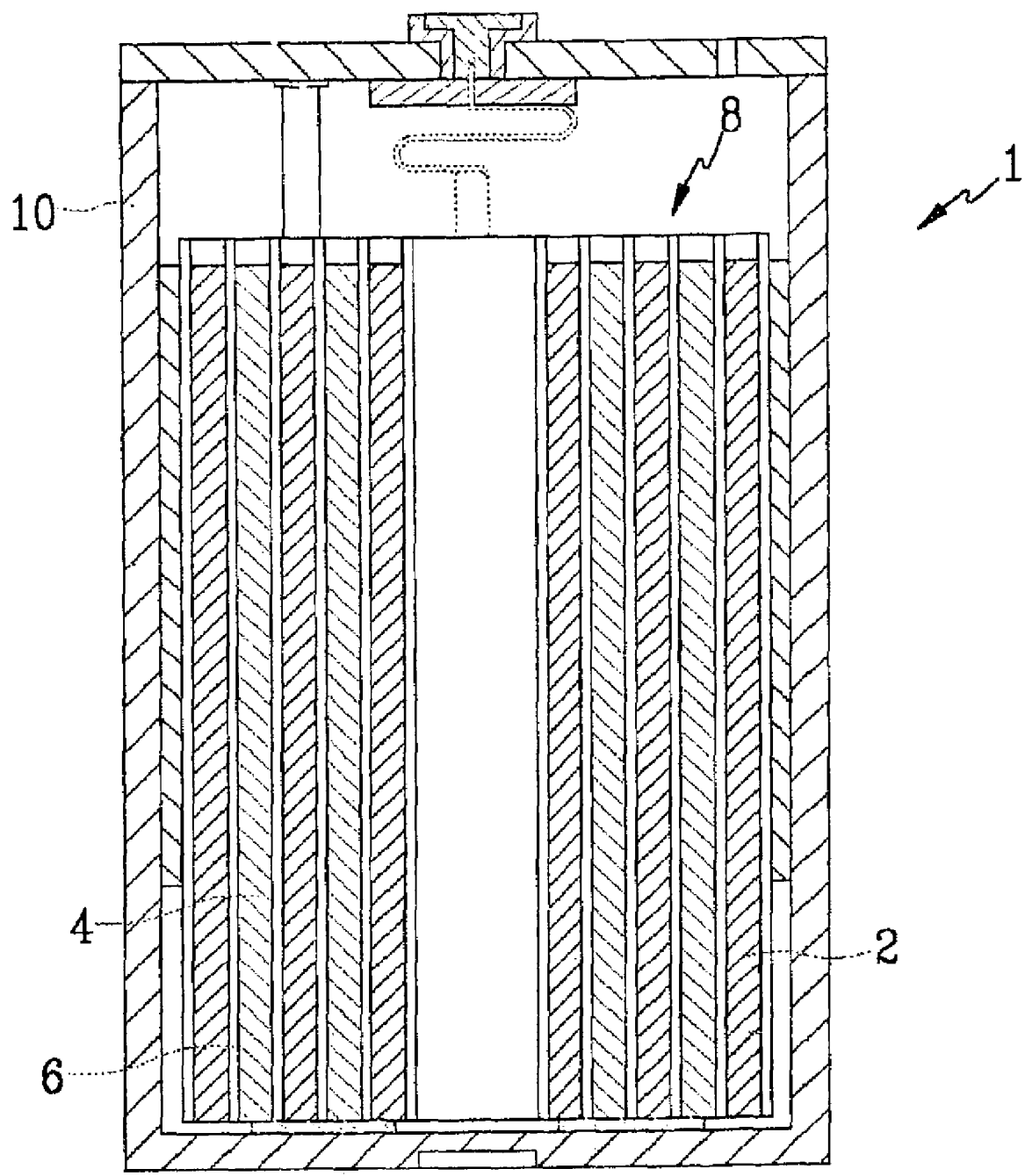
FIG. 1 illustrates a cross-sectional view of a lithium secondary battery cell.

Reference will now be made in detail to the present embodiments of the present invention, examples of which are illustrated in the accompanying drawings and specific examples, wherein like reference numerals refer to like elements throughout. The embodiments are described below in order to explain the present invention by referring to the figures and the specific examples.

In a preparation method of active material according to the present invention, an active material precursor having a surface-treatment layer comprising a compound with the formula (1) on the surface thereof is produced, and then the active material precursor and lithium source are reacted to produce an active material:

$$MXO_k \qquad (1)$$

wherein M is at least one element selected from the group consisting of an alkali metal, an alkaline earth metal, a group 13 element, a group 14 element, a transition metal, and a rare-earth element; X is an element that is capable of forming a double bond with oxygen; and k is a numerical value in the range of 2 to 4.

First, the coating liquid is prepared by reacting a compound containing X, an element that is capable of forming a double bond with oxygen, with a compound containing M (an alkali metal, an alkaline earth metal, a group 13 element, a group 14 element, a transition metal, a rare-earth element, or a combination thereof) in water. In this invention, "coating liquid" refers to a homogeneous suspension or a solution.

Since water is used as a solvent in the coating liquid, the present process is advantageous over the process using an organic solvent in terms of process cost-reduction.

The choice of the compound type containing the element X has no particular limitation as long as the compound is soluble in water. For example, when X is P, it can be diammonium hydrogen phosphate (($NH_4$)$_2$$HPO_4$)), $P_2O_5$, $H_3PO_4$, or $Li_3PO_4$. The content of the compound containing the element X is preferably 0.01 to 30% by weight, and more preferably 0.1 to 20% by weight of the total weight of the coating liquid.

The element X forms a double bond with oxygen in terms of classical chemical bonding. For example, in classical Chemistry, when X bonds with four oxygen elements, it means one double bond and three single bonds. However, in modern Chemistry, it means that X bonds with 1.25 oxygens because of delocalization of electrons.

The element M used for the coating liquid is an alkali metal, an alkaline earth metal, a group 13 element, a group 14 element, a transition metal, a rare-earth element, or a combination thereof. The preferable examples of these elements are Al, Ni, Co, Zr, Mn, Cr, Fe, Mg, Sr, V, or a combination thereof. The group 13 element (according to the new IUPAC agreement) refers to the element group including Al of the Periodic Table. The group 14 element (according to the new IUPAC agreement) refers to the element group including Si of the Periodic Table.

The choice of the compound type comprising these elements has no particular limitation as long as the compound is soluble in water. The preferred examples are nitrate and acetate. The amount of the compound containing the element M, i.e., an alkali metal, an alkaline earth metal, a group 13 element, a group 14 element, a transition metal, a rare earth element, or a combination thereof, is preferably 0.01 to 30% by weight, and more preferably 0.1 to 20% by weight of the coating liquid.

The coating liquid as prepared above is used to surface-treat (coat) a metal source that does not include lithium in order to prepare an active material precursor. The coating may be achieved by simply adding a predetermined amount of the coating liquid to a given amount of the active material powder followed by a thorough mixing step and an optional drying step, although the present invention is not limited to this method.

The metal source includes a material including a metal except lithium that is incorporated in a conventional lithium-containing compound as an active material. Examples of the metal are Co, Mn, Ni, Al, Cr, Fe, Mg, Sr, V, rare earth elements, or combinations thereof, and preferably Ni and Ni—Mn. The metal source may further include fluorine, sulfur, or phosphorous elements. The metal source may be a metal salt (e.g., nickel salt and manganese salt).

The type of the metal source may be chosen by a person skilled in this art. For example, in the case the metal is manganese, a manganese source includes manganese acetate, manganese dioxide, or manganese nitrate; in the case of cobalt, a cobalt source includes cobalt hydroxide, cobalt oxide, cobalt nitrate, or cobalt carbonate; and in the case of nickel, a nickel source includes nickel hydroxide, nickel nitrate, and nickel acetate, but they are not limited thereto.

The metal source may include more than one metal. These metal sources can be prepared using a solid phase synthesis method or a co-precipitation method. In the former method, at least two metal sources in solid powder states are mixed and heat-treated to prepare the metal source including at least two metals. In the latter method, at least two metal sources in solution states are mixed, and pH of the mixture is controlled to prepare the metal source including at least two metals. Fluorine sources, sulfur sources, or phosphorous sources may be further introduced to the active material precursor together with the metal sources in order to obtain at least two metals and fluorine, sulfur, or phosphorous elements. The fluorine source may be manganese fluorine or lithium fluorine, and the sulfur source may be manganese sulfide or lithium sulfide. The phosphorous source may be $H_3PO_4$. These compounds are preferable examples, but the present invention is not limited thereto.

Subsequent to wet coating of the metal source, the coated metal source is dried to obtain an active material precursor. The drying process is preferably performed at 100 to 200° C. The drying duration need not be particularly limited, but it is preferably at least two hours, and more preferably 2 to 10 hours.

Then, the coated active material precursor is mixed with the lithium source at an equivalent ratio and heat-treated to have the active material precursor react with the lithium. The lithium sources include lithium acetate, lithium nitrate, lithium carbonate, and lithium hydroxide, but they are not limited thereto.

The heat-treatment process may be performed either once or twice. In the case that heat-treatment is performed once, it is performed at a temperature of about 600 to 850° C., and preferably 700 to 800° C., for 1 to 20 hours. If the heat-treatment temperature or duration is out of these ranges, a $MXO_k$ compound (where M and X are defined as above) is diffused into the center of the resultant active material resulting in a decrease of capacity of the active material.

In the case that heat-treatment is performed twice, it is performed at a temperature of about 400 to 600° C. firstly, and at a temperature of about 700 to 850° C. secondly.

Conventionally, a lithium-containing compound as an active material is synthesized as follows: a lithium source and a metal source are mixed at a desired equivalent ratio, the mixture is heat-treated at 400 to 600° C. firstly to produce a semi-crystalline precursor material, and the semi-crystalline precursor material is heat-treated for 10 to 15 hours at 700 to 900° C. secondly. In the present invention, one heat-treatment is sufficient for producing a lithium-containing compound with appropriate electrochemical properties, resulting in cost reduction during large-scale production relative to the prior art process.

The inventors of the present invention have filed U.S. application Ser. No. 09/995,868, the disclosure of which is incorporated herein by reference, wherein a lithium-containing compound is surface-treated using a coating liquid of the present invention to improve electrochemical performance and thermal stability. In the above application, two heat-treatments are performed to synthesize the lithium-containing compound followed by an additional heat-treatment for surface-treatment. The surface-treatment is performed for the final product, the lithium-containing compound.

In the present invention, surface-treatment is performed for an intermediate product. That is to say, a surface-treated metal source and a lithium source are mixed, followed by one or optionally two heat-treatments to synthesize a surface-treated lithium-containing compound. In accordance with the process of the present invention, the process time for synthesizing a surface-treated lithium-containing compound can be reduced by 20% relative to the process of the U.S. application Ser. No. 09/995,868.

In the prior art process, a sieving process step is required since particle agglomeration usually occurs due to a high calcination temperature. However, in the process of the present invention, such a sieving process is not required since the calcination temperature is significantly reduced, resulting in negligible particle agglomeration.

The surface-treated (coated) active material synthesized after the heat-treatment has a surface-treatment layer comprising a compound having the formula (1):

$$MXO_k \quad (1)$$

wherein M is at least one element selected from the group consisting of an alkali metal, an alkaline earth metal, a group 13 element, a group 14 element, a transition metal, and a rare-earth element; X is an element that is capable of forming a double bond with oxygen; and k is a numerical value in the range of 2 to 4. In the surface-treatment layer comprising the $MXO_k$ compound, the elements M and X have a concentration gradient from the surface of the active material toward the center of the active material particle grain. That is, M and X have a high concentration at the surface of the active material, and the concentration gradually decreases toward the inside of the particle.

The amount of element M of the compound with the formula (1) of the present invention is 0.1 to 15% by weight, and preferably 0.1 to 6% by weight of the active material. Also, the amount of element X that is capable of forming a double bond with oxygen of the compound having the formula (1) is 0.1 to 15% by weight, and preferably 0.1 to 6% by weight of the active material. When the amount of M or X present in the surface of the active material is not in the above range, electrochemical characteristics at a high rate are not improved, and the thermal stability is not improved by the coating.

The surface-treatment layer may further comprise a solid-solution compound produced by reaction between the surface-treated active material precursor and the $MXO_k$ compound with the formula (1) through heat-treatment, in addition to the $MXO_k$ compound. The solid-solution compound comprises Li, M' (M' is at least one selected from the group consisting of Al, Ni, Co, Mn, Cr, Fe, Mg, Sr, V, and a rare-earth element, that originate from the active material precursor, as a metal source), M (M is at least one selected from the group consisting of an alkali metal, an alkaline earth metal, a group 13 element, a group 14 element, a transition metal, and a rare-earth element), X (an element capable of forming a double bond with oxygen), and O (oxygen).

The thickness of the surface-treatment layer of the present invention is preferably 0.01 to 2 μm, and more preferably 0.01 to 1 μm. While other thicknesses are possible, if the thickness of the surface-treatment layer is less than 0.01 μm, the effect obtained from the surface-treatment layer may not be realized. In contrast, if the thickness is more than 2 μm, the capacity of the battery is deteriorated.

According to the preferable examples of the present invention, an active material for a battery comprising a lithium-containing compound and a surface-treatment layer including $AlPO_k$ (k is 2 to 4) is provided. The surface-treatment layer may comprise a solid-solution compound having Al and P produced by reaction between the active material precursor and the $AlPO_k$ compound.

The surface treated active material of the present invention maybe used as a positive active material of all lithium batteries, such as a lithium primary battery and a lithium secondary battery. The active material prepared by the above defined process is used for preparing a positive electrode, and a battery comprising the positive electrode is manufactured.

The present invention also provides an improved lithium battery which can be fabricated according to the process. The structure of a lithium battery is well known in the art pertaining to the present invention. For example, a cross-sectional view of a prismatic lithium secondary battery cell according to a preferred embodiment of the present invention is illustrated in FIG. 1. As shown in FIG. 1, the lithium secondary battery 1 is fabricated by the following process. An electrode assembly 8 is prepared by winding a positive electrode 2, a negative electrode 4, and a separator 6 interposed between the positive and negative electrodes 2 and 4, then placing the electrode assembly 8 into a battery case 10. An electrolyte is injected into the case 10, and the upper part of the battery case 10 is then sealed. In the battery, a conventional negative electrode 4 and electrolyte can be used. The negative electrode 4 comprises a material that can reversibly deintercalate/intercalate lithium ions, such as a carbonaceous material, and the electrolyte comprises lithium salts and organic solvents. It is understood that other types of batteries can be constructed using the coated active material of the present invention. Further, it is understood that, where the separator 6 is a solid electrolyte, the separator 6 and the electrolyte need not be included separately.

The most important factor affecting safety of a battery is the reactivity of the active material in a charged state at its surface, toward the electrolyte. For example, one lithiated intercalation compound, $LiCoO_2$, has a structure of α-$NaFeO_2$, while it has a structure of $Li_{1-x}CoO_2$ during charge and discharge cycles. When it is charged at a voltage of over 4.93V, Li is completely removed, and it has a structure of a hexagonal type of $CdI_2$. In such a lithium metal oxide, as the amount of lithium decreases, thermal stability decreases, and it becomes a stronger oxidant. When a battery containing $LiCoO_2$ active material is fully charged, the active material composition becomes $Li_{1-x}CoO_2$ where x is greater than or equal to 0.5. Such a composition becomes unstable as the battery temperature rises, i.e., the oxygen bound with the metal cobalt, is released to form gaseous $O_2$. The released oxygen may react with the electrolyte inside the battery, possibly leading to an explosion. Therefore, the oxygen-releasing temperature (exothermic reaction starting temperature) and the amount of exothermic heat released by the reaction are important factors to determine the safety of the battery. Such thermal stability can be evaluated from DSC (Differential Scanning Calorimetry) curves by determining the starting temperature of the exothermic reaction and the heat of reaction.

Unlike the conventional active material, an active material that is surface-treated with the $MXO_k$ compound of the present invention has a DSC exothermic peak that is almost negligible in size, since the $MXO_k$ compound inhibits reaction with an electrolyte. Therefore, the active material of the present invention is substantially improved in thermal stability over the conventional surface-untreated active material.

The present invention is further explained in more detail with reference to the following examples. These examples, however, should not in any sense be interpreted as limiting the scope of the present invention.

EXAMPLE 1

A coating liquid was prepared by adding 0.5 g of $(NH_4)_2HPO_4$ and 1.5 g of aluminum nitrate $(Al(NO_3)_3 \cdot 9H_2O)$ to 30 g of water. The resulting coating liquid was a homogeneous colloidal suspension in an amorphous $AlPO_k$ phase. After adding 50 g of $Ni_{0.8}Co_{0.1}Mn_{0.1}(OH)_2$ powder as an active material precursor to a 10 ml portion of the coating liquid, it was thoroughly dried at 130° C. The dried powders and $LiOH.H_2O$ were mixed at a mole ratio of 1:1.03. The mixture was heat-treated at 770° C. for 20 hours to obtain $Li_{1.03}Ni_{0.8}Co_{0.1}Mn_{0.1}O_2$ with the surface-treatment of $AlPO_k$ (k is 2 to 4).

The slurry for the positive electrode containing the surface-treated $Li_{1.03}Ni_{0.8}Co_{0.1}Mn_{0.1}O_2$ as a positive active material, super P (conductive agent), and polyvinylidene fluoride (binder) in the weight ratio of 94/3/3 was prepared by mixing them thoroughly in an N-methyl pyrrolidone (NMP) solvent. The slurry comprising the positive active material was coated on an Al foil at a thickness of about 300 µm, dried for 20 minutes at 130° C., and pressed under 1 ton pressure to make a positive electrode for a coin cell. A coin-type half-cell was prepared by using this positive electrode, and lithium metal as a counter electrode. For, the electrolyte, a 1M $LiPF_6$ solution of a mixed solvent of ethylene carbonate (EC) and dimethyl carbonate (DMC) in the volume ratio of 1:1 was used.

EXAMPLE 2

A coin-typed half-cell was prepared by the same method as in Example 1, except that a coating liquid was prepared by adding 1 g of $(NH_4)_2HPO_4$ and 3 g of aluminum nitrate $(Al(NO_3)_3.9H_2O)$ to 30 g of water.

EXAMPLE 3

A coin-typed half-cell was prepared by the same method as in Example 1, except that $Ni_{0.8}Co_{0.1}Mn_{0.1}CO_3$ powder was used as an active material precursor.

EXAMPLE 4

A coin-typed half-cell was prepared by the same method as in Example 1, except that $Ni_{0.8}Co_{0.1}Mn_{0.1}SO_4$ powder was used as an active material precursor.

EXAMPLE 5

A coin-typed half-cell was prepared by the same method as in Example 1, except that $Ni_{0.8}Co_{0.1}Mn_{0.1}(NO_3)_2$ powder was used as an active material precursor.

EXAMPLE 6

A coin-typed half-cell was prepared by the same method as in Example 1, except that $Ni_{0.9}Co_{0.1}(OH)_2$ powder was used as an active material precursor.

EXAMPLE 7

A coin-typed half-cell was prepared by the same method as in Example 1, except that $Ni_{0.89}Co_{0.1}La_{0.01}(OH)_2$ powder was used as an active material precursor.

COMPARATIVE EXAMPLE 1

A coin-typed half-cell was prepared by the same method as in Example 1, except that $LiNi_{0.8}Co_{0.1}Mn_{0.1}O_2$ powder was used as the positive active material.

REFERENCE EXAMPLE 1

$Ni_{0.8}Co_{0.1}Mn_{0.1}(OH)_2$ and $LiOH.H_2O$ were mixed in an equivalent ratio of 1:1.03, and they were subjected to a first heat-treatment at 480° C. The mixture was ground, and then a second heat-treatment was performed for 20 hours at 770° C. to obtain $LiNi_{0.8}Co_{0.1}Mn_{0.1}O_2$ powder. The 50 g of $LiNi_{0.8}Co_{0.1}Mn_{0.1}O_2$ powder and 10 g of the coating liquid of Example 1 were mixed and then thoroughly dried at 130° C. The dried mixture was heat-treated for 5 hours at 700° C. to obtain $LiNi_{0.8}Co_{0.1}Mn_{0.1}O_2$ with the surface-treatment of $AlPO_k$ (k is 2 to 4).

In order to identify the forming of the surface-treatment of $AlPO_k$ (k is 2 to 4), distribution of various elements through the bulk of the particle was measured using Electron Probe Micro Analysis (EPMA). EPMA for Ni, Mn, Co, Al, and P was performed by line scanning across the cross-section of a particle grain of the active material (particle diameter; 15 µm) prepared in Example 1. The results are shown in Table 1.

TABLE 1

| Distance(µm) | Ni | Mn | Co | Al | P |
|---|---|---|---|---|---|
| 1 | 64 | 12 | 12 | 6 | 6 |
| 2 | 70 | 12 | 12 | 4 | 4 |
| 3 | 80 | 10 | 10 | 0 | 0 |
| 4 | 80 | 10 | 10 | 0 | 0 |
| 5 | 80 | 10 | 10 | 0 | 0 |
| 6 | 80 | 10 | 10 | 0 | 0 |
| 7 | 80 | 10 | 10 | 0 | 0 |
| 8 | 80 | 10 | 10 | 0 | 0 |
| 9 | 80 | 10 | 10 | 0 | 0 |
| 10 | 80 | 10 | 10 | 0 | 0 |
| 11 | 80 | 10 | 10 | 0 | 0 |
| 12 | 80 | 10 | 10 | 0 | 0 |
| 13 | 70 | 12 | 12 | 4 | 4 |
| 14 | 66 | 10 | 10 | 7 | 7 |

As shown Table 1, the presence of Al and P was found at both ends of the cross section of the positive active material. These results indicate that the surface-treatment layer comprising Al and P existed on the surface of the active material.

Charge-discharge characteristics of the coin-typed half-cell of Examples 1 and 2, Comparative Example 1, and Reference Example 1 at 0.1 C rates in the voltage range of 4.3V to 2.75V are shown in Table 2.

Figure 2:
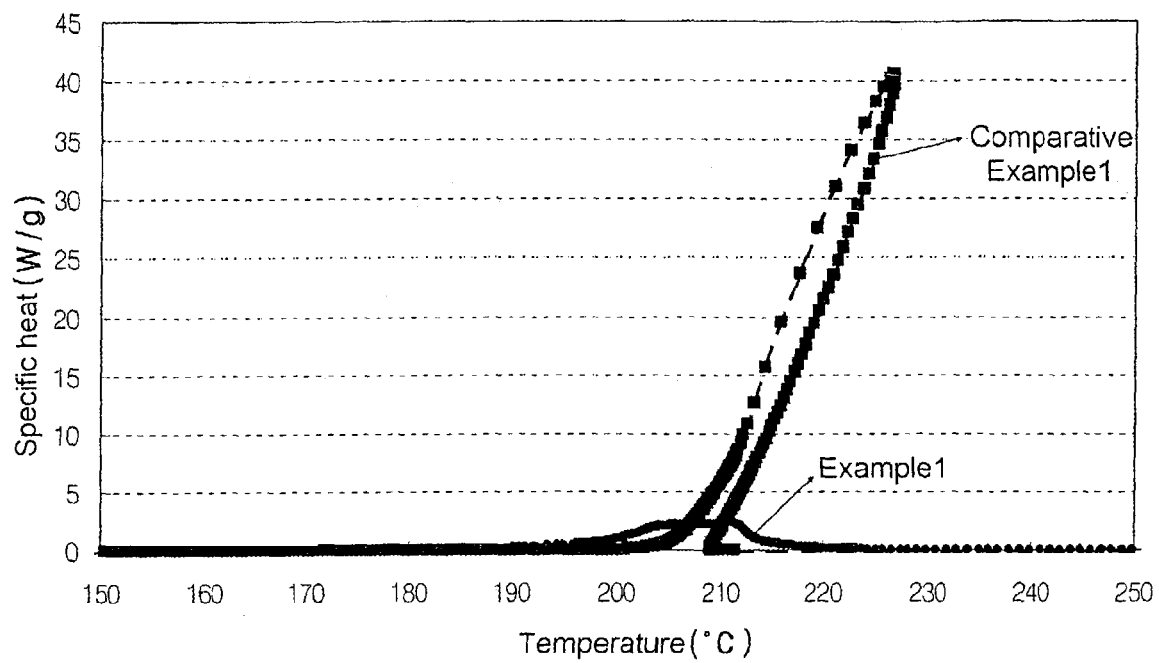
FIG. 2 shows the results of Differential Scanning Calorimetry (DSC) of active materials obtained after charging half-cells prepared according to Example 1 of the present invention and Comparative Example 1, at 4.5V.

In order to evaluate thermal stability of the positive active material prepared according to Examples, Comparative Example, and Reference Example, DSC analysis was performed as follows. The coin cells of Examples, Comparative Examples, and Reference Examples were charged using a voltage cut-off at 4.5V. About 10 mg of the positive active materials from charged electrodes of each cell were collected, DSC analyses were carried out in sealed aluminum cans using a 910 DSC (TA Instrument company) by scanning temperatures from 100 to 300° C. at the rate of 3° C./min. The results of Examples 1 and 2, Comparative Example 1, and Reference Example 1 are shown in Table 2. Particularly, measurement results of Example 1 and Comparative Example 1 are shown in FIG. 2.

TABLE 2

| | 0.1 C Charge Capacity (mAh/g) | 0.1 C Discharge Capacity (mAh/g) | Amount of Exothermic Heat (w/g) |
|---|---|---|---|
| Example 1 | 217 | 185 | 5 |
| Example 2 | 216 | 186 | 3 |
| Comparative Example 1 | 215 | 186 | 42 |
| Reference Example 1 | 216 | 185 | 5 |

As shown in Table 2, the surface-treatment does not have an effect on charge-discharge characteristics at 0.1 C of the positive active materials. But the comparison of the amounts of exothermic heat shows that the amounts of the exothermic heat of Examples 1 and 2 are about 7.14 to 11.90% of that of Comparative Example 1.

The active material of Comparative Example 1 (not surface-treated $LiNi_{0.8}Co_{0.1}Mn_{0.1}O_2$) showed a large exothermic peak as a result of $O_2$ release from the breakage of metal-O bonds of charged $Li_{1-x}Ni_{0.8}Co_{0.1}Mn_{0.1}O_2$ followed by the exothermic reaction of the oxygen with an electrolyte. This phenomenon is known as the cause of the safety problem. However, in the case of Examples 1 and 2, the exothermic peak in the DSC was reduced to a negligible size, strongly suggesting that the thermal stability, and therefore the safety of the batteries using the active material of Examples 1 and 2, is much better than that of Comparative Example 1.

The active material containing the surface-treatment layer comprising the $MXO_k$ (k is 2 to 4) compound of the present invention shows excellent structural stability and excellent thermal stability. In addition, the process of the present invention uses a water-based coating liquid giving a great low cost benefit over a similar process using an organic solvent-based solution. Since the process is performed at a lower temperature and in a shorter process time than the conventional process using an organic solvent, productivity is expected to be improved in large-scale production.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents that may be resorted to fall within the scope of the invention and the appended claims.

What is claimed is:

1. A process for preparing an active material for a lithium battery, comprising the steps of:
    preparing a coating liquid by adding a first compound containing an element X and a second compound containing an element M to water, said element X being capable of forming a double bond with oxygen, said element M comprising at least one selected from the group consisting of an alkali metal, an alkaline earth metal, a group 13 element, a group 14 element, a transition metal, and a rare-earth element;
    adding a metal source to the coating liquid to surface-treat the metal source, the metal source being free from a lithium source;
    drying the surface-treated metal source to prepare an active material precursor;
    mixing the active material precursor with the lithium source; and
    heat-treating the resultant mixture to produce the active material.

2. The process of claim 1, wherein the element M is selected from the group consisting of Na, K, Mg, Ca, Sr, Ni, Co, Si, Ti, B, Al, Sn, Mn, Cr, Fe, V, Zr, and a combination thereof.

3. The process of claim 1, wherein the element X is selected from the group consisting of P, S, W, and a combination thereof.

4. The process of claim 1, wherein an amount of said second compound is 0.01 to 30 percent by weight of the coating liquid.

5. The process of claim 1, wherein an amount of said second compound is 0.01 to 20 percent by weight of the coating liquid.

6. The process of claim 1, wherein an amount of said first compound is 0.01 to 30 percent by weight of the coating liquid.

7. The process of claim 1, wherein an amount of said first compound is 0.1 to 20 percent by weight of the coating liquid.

8. The process of claim 1, wherein the metal source is a salt including a metal selected from the group consisting of Al, Ni, Co, Mn, Cr, Fe, Mg, Sr, V, and rare earth elements.

9. The process of claim 1, wherein the drying step is performed at a temperature ranging from 100 to 200° C.

10. The process of claim 1, wherein the heat-treating step is performed at a temperature ranging from 600 to 850° C.

11. The process of claim 1, wherein the metal source includes nickel salt and manganese salt.

12. A process of preparing an active material precursor for a battery, comprising the steps of:
    preparing a coating liquid by adding a first compound containing an element X and a second compound containing an element M to water;
    adding a metal source to the coating liquid to surface-treat a layer of the metal source, wherein the metal source added to the coating liquid is free from a lithium source; and
    drying the surface-treated metal source to prepare the active material precursor;
    wherein the metal source with the surface-treated layer comprises the compound of the formula (1):

$$MXO_k \qquad (1)$$

wherein M is at least one selected from the group consisting of an alkali metal, an alkaline earth metal, a group 13 element, a group 14 element, a transition metal, and a rare-earth element;
    wherein X is an element that can form a double bond with oxygen; and
    wherein k is a numerical value in the range of 2 to 4.

13. The process of claim 12, wherein the element M is selected from the group consisting of Na, K, Mg, Ca, Sr, Ni, Co, Si, Ti, B, Al, Sn, Mn, Cr, Fe, V, Zr, and a combination thereof.

14. The process of claim 12, wherein the element X is selected from the group consisting of P, S, W, and a combination thereof.

15. A process for preparing a lithium battery, comprising the steps of:
    preparing a coating liquid by adding a first compound containing an element X and a second compound containing an element M to water, said element X being capable of forming a double bond with oxygen, said element M comprising at least one selected from the group consisting of an alkali metal, an alkaline earth metal, a group 13 element, a group 14 element, a transition metal, and a rare-earth element;
    adding a metal source to the coating liquid to surface-treat the metal sources, wherein the metal source added to the coating liquid is free from a lithium source;
    drying the surface-treated metal source to prepare an active material precursor;
    mixing the active material precursor with a lithium source; and
    heat-treating the resultant mixture to produce an active material with a surface-treated layer comprising a third compound having the formula (1):

$$MXO_k \qquad (1)$$

wherein k is a numerical value in the range of 2 to 4;
preparing a positive electrode comprising the active material; and
fabricating the battery comprising the positive electrode.

16. A process for preparing an active material for a battery, comprising the steps of:

preparing a coating liquid by adding a first compound containing an element X and a second compound containing an element M to water, said element X being capable of forming a double bond with oxygen, said element M comprising at least one selected from the group consisting of an alkali metal, an alkaline earth metal, a group 13 element, a group 14 element, a transition metal, and a rare-earth element;

adding nickel salt and manganese salt to the coating liquid to surface-treat the nickel salt and the manganese salt;

drying the surface-treated nickel salt and manganese salt to prepare an active material precursor;

mixing the active material precursor with a lithium source; and heat-treating the resultant mixture to produce the active material with a surface layer comprising a third compound of formula (1):

$$MXO_k \qquad (1)$$

wherein k is a numerical value in the range of 2 to 4.

* * * * *